UNITED STATES PATENT OFFICE.

EUGEN SCHAAL, OF FEUERBACH, WÜRTEMBERG, GERMANY.

MANUFACTURE OF ARTIFICIAL COPAL.

SPECIFICATION forming part of Reissued Letters Patent No. 11,069, dated April 1, 1890.

Original No. 382,907, dated May 15, 1888. Application for reissue filed October 28, 1888. Serial No. 289,070.

*To all whom it may concern:*

Be it known that I, EUGEN SCHAAL, a subject of the King of Würtemberg, residing at Feuerbach, near Stuttgart, in the Kingdom of Würtemberg and German Empire, have invented new and useful Improvements in the Manufacture of Artificial Copal, of which the following is a specification.

This invention relates to the manufacture of a new resinous product, which I term "artificial copal," and which is obtained by the action of an alcohol—such as resorcin—upon colophony, or similar resins, and subsequent separation by distillation *in vacuo* at a temperature of about 300° centigrade.

As an example of the manner in which my invention can be carried out, I give the following:

I heat colophony in a metallic retort containing a stirring device under a vacuum of about sixty-six centimeters to a temperature of about 305° centigrade, where the soft constituents are distilled off. Of the residuum I take five hundred pounds and mix the same with one hundred pounds of resorcin. This mass is then heated in a closed boiler under agitation to from 200° to 250° centigrade until the pressure in the boiler has reached from fifteen to thirty pounds to the square inch. Then the steam formed in the boiler is allowed to escape. A small sample of about five grams is taken from the boiler, dissolved in about fifteen grams of ether, shaken together with one gram of a solution of sodium carbonate, and finally the clear liquid portion is separated. If this liquid portion, after having been supersaturated with a mineral acid, remains clear, the formation of the resin-acid ether is completed; but if a thick mass is formed the contents of the boiler are again heated, as above stated, until a sample taken therefrom and treated as above stated indicates that the formation of the resin-acid ether is completed. This process usually takes from six to eight hours. The entire mixture is then distilled off under a vacuum of about sixty-six centimeters up to the temperature of about 305° centigrade, and the residuum which remains in the boiler, and which constitutes my new resinous product, is poured on flat trays, where it is permitted to cool off.

In the foregoing process other alcohols may be substituted for resorcin—such, for instance, as methyl alcohol, ethyl alcohol, phenol, the two naphthols, or glycerine.

This product has in its outward appearance a resemblance to copal, and for that reason I have termed the same "artificial copal."

My artificial copal is insoluble in carbonate of soda; but if the same is finely pulverized and shaken in from one to four parts of cold petroleum-benzine it dissolves readily, while natural copal cannot be dissolved in any appreciable quantity by shaking repeatedly in benzine.

By exposing my artificial copal to the action of caustic alkalies in the presence of heat it is split up into the resin acid and the alcoholic body used in its preparation—that is to say, if the artificial copal has been prepared by the action of resorcin on abietic acid it will split up into abietic acid and resorcin. The formula for the resin-acid ether, obtained by the action of resorcin ($C_6H_6O_2$) on abietic acid, ($C_{44}H_{64}O_5$) is as follows: $C_{42}H_{62}O\begin{matrix}COOH\\COOH\end{matrix}+C_6H_4\begin{matrix}OH\\OH\end{matrix}=C_{42}H_{62}O\begin{matrix}COO\\COO\end{matrix}C_6H_4+2(OH_2)$ and, since the two equivalents of water, $2(OH_2)$, escape, the formula for the resin-acid ether, prepared as above stated, is $C_{44}H_{62}O\begin{matrix}COO\\COO\end{matrix}C_6H_4$.

I do not claim in this application the process of producing resin-acid ethers, such having been claimed in Letters Patent No. 335,485, granted to me February 2, 1886.

What I claim as new, and desire to secure by Letters Patent, is—

1. The new resinous product herein described, which is produced by the action of an alcohol on a resin acid, which dissolves readily in petroleum-benzine, but it is insoluble in alkaline carbonates, and which by the action of a caustic alkali splits up into a resin acid and an alcohol.

2. The new resinous product herein described, produced by the action of an alcohol upon colophony, which product is soluble in petroleum-benzine but insoluble in alkaline carbonates, and which by the action of caustic alkalies splits up into abietic acid and the alcohol employed in the operation.

In testimony whereof I have hereunto set my hand in presence of two subscribing witnesses.

EUGEN SCHAAL.

Witnesses:
H. HÄNDLER,
CARL WERNLE.